United States Patent
Roh et al.

(10) Patent No.: US 9,689,603 B2
(45) Date of Patent: Jun. 27, 2017

(54) REFRIGERATOR AND METHOD OF CONTROLLING THE SAME

(71) Applicants: SAMSUNG ELECTRONICS CO., LTD., Suwon-si, Gyeonggi-do (KR); NDIS Corporation, Asan-si, Chungcheongnam-do (KR)

(72) Inventors: Hee Yuel Roh, Suwon-si (KR); Soon-Bum Kwon, Asan-si (KR); Kyoung Sun Kim, Asan-si (KR); Joo Ho Kim, Suwon-si (KR); Otsuka Tatsuhiro, Suwon-si (KR); Burm-Young Lee, Asan-si (KR)

(73) Assignees: SAMSUNG ELECTRONICS CO., LTD., Suwon-si (KR); NDIS CORPORATION, Asan-si (KR)

( * ) Notice: Subject to any disclaimer, the term of this patent is extended or adjusted under 35 U.S.C. 154(b) by 42 days.

(21) Appl. No.: 14/672,934

(22) Filed: Mar. 30, 2015

(65) Prior Publication Data
US 2015/0276302 A1 Oct. 1, 2015

(30) Foreign Application Priority Data

Apr. 1, 2014 (KR) .......................... 10-2014-0038845

(51) Int. Cl.
*F25D 23/02* (2006.01)
*F25D 29/00* (2006.01)
(Continued)

(52) U.S. Cl.
CPC ........... *F25D 23/028* (2013.01); *F25D 29/00* (2013.01); *G02F 1/13718* (2013.01); *G02F 1/133377* (2013.01); *G06F 3/04883* (2013.01); *G09G 3/3406* (2013.01); *G09G 3/3433* (2013.01); *G09G 3/36* (2013.01); *F25D 23/02* (2013.01);
(Continued)

(58) Field of Classification Search
CPC ........... F25D 2400/36; F25D 2400/361; F25D 2323/02–2323/024; F25D 23/02–23/024
See application file for complete search history.

(56) References Cited

U.S. PATENT DOCUMENTS 5,365,541 A * 11/1994 Bullock ................. B82Y 20/00
  372/19
9,052,536 B2 * 6/2015 Artwohl ................ A47F 3/0434
(Continued)

FOREIGN PATENT DOCUMENTS

EP 1 039 441 A2 9/2000
EP 2 693 332 A1 2/2014
(Continued)

OTHER PUBLICATIONS

European Search Report issued Aug. 14, 2015 in corresponding European Patent Application No. 15161491.4.

*Primary Examiner* — Patrick F Marinelli
(74) *Attorney, Agent, or Firm* — Staas & Halsey LLP

(57) ABSTRACT

A refrigerator includes a body including a storage chamber; a door that is coupled to the body so as to open/close the storage chamber; a display that is disposed in at least one region of the door and is configured to be converted between a transparent mode and a display mode; and a controller that controls the display to display at least one among a text, an image, and color when the display is in the display mode.

14 Claims, 20 Drawing Sheets

(51) Int. Cl.
*G06F 3/0488* (2013.01)
*G09G 3/34* (2006.01)
*G09G 3/36* (2006.01)
*G02F 1/1333* (2006.01)
*G02F 1/137* (2006.01)

(52) U.S. Cl.
CPC .... *F25D 2400/361* (2013.01); *F25D 2700/12* (2013.01); *G09G 2300/0486* (2013.01)

(56) References Cited

U.S. PATENT DOCUMENTS

| | | | | |
|---|---|---|---|---|
| 9,155,405 B2* | 10/2015 | Artwohl | | A47F 3/0434 |
| 9,236,016 B2* | 1/2016 | Huang | | G02F 1/133533 |
| 9,240,162 B2* | 1/2016 | Kim | | G09G 5/10 |
| 2003/0103023 A1* | 6/2003 | Ootsuka | | F25D 29/005 345/87 |
| 2008/0253411 A1* | 10/2008 | McPhail | | B82Y 20/00 372/26 |
| 2009/0231252 A1* | 9/2009 | Maegawa | | G06F 21/84 345/87 |
| 2010/0265214 A1* | 10/2010 | Green | | G06F 3/038 345/174 |
| 2011/0133687 A1* | 6/2011 | Kim | | H04M 1/72563 320/101 |
| 2012/0050650 A1* | 3/2012 | Liu | | C09K 19/586 349/89 |
| 2012/0099062 A1* | 4/2012 | Chen | | G02F 1/13718 349/115 |
| 2012/0113156 A1* | 5/2012 | Lim | | G09G 3/3629 345/690 |
| 2012/0127406 A1* | 5/2012 | Geisow | | G02F 1/13718 349/113 |
| 2012/0256823 A1* | 10/2012 | Lee | | G06F 3/011 345/156 |
| 2012/0256854 A1* | 10/2012 | Lee | | G06F 1/1643 345/173 |
| 2012/0256886 A1* | 10/2012 | Ryu | | G06F 1/1632 345/204 |
| 2012/0268669 A1* | 10/2012 | Ishikawa | | G02F 1/13718 349/12 |
| 2012/0285089 A1* | 11/2012 | Artwohl | | A47F 3/0434 49/70 |
| 2013/0082948 A1* | 4/2013 | Ok | | F25D 29/00 345/173 |
| 2013/0194167 A1* | 8/2013 | Yun | | G09G 5/003 345/84 |
| 2013/0214664 A1* | 8/2013 | Yoon | | F16L 59/065 312/405 |
| 2013/0249827 A1* | 9/2013 | Jeong | | G06F 3/0414 345/173 |
| 2013/0271445 A1* | 10/2013 | Park | | G09G 5/003 345/212 |
| 2013/0278485 A1* | 10/2013 | Kim | | G09G 3/36 345/32 |
| 2014/0035850 A1* | 2/2014 | Shin | | G06F 3/041 345/173 |
| 2014/0045553 A1* | 2/2014 | Shimada | | G06F 3/041 455/566 |
| 2014/0101589 A1* | 4/2014 | Hyun | | F25D 29/00 715/769 |
| 2014/0144083 A1* | 5/2014 | Artwohl | | A47F 3/0434 49/70 |
| 2014/0184577 A1* | 7/2014 | Kim | | G09G 5/10 345/207 |
| 2014/0292839 A1* | 10/2014 | Huang | | G02F 1/133533 345/694 |
| 2015/0038103 A1* | 2/2015 | Park | | H04M 1/72533 455/404.1 |
| 2015/0170608 A1* | 6/2015 | Kim | | G09G 5/14 345/592 |
| 2015/0216326 A1* | 8/2015 | Artwohl | | A47F 3/0434 345/173 |
| 2015/0228217 A1* | 8/2015 | Perdices-Gonzalez | | G09G 3/348 345/5 |
| 2015/0228253 A1* | 8/2015 | Lee | | G09G 5/30 345/592 |
| 2015/0276302 A1* | 10/2015 | Roh | | G02F 1/133377 62/56 |
| 2015/0335174 A1* | 11/2015 | Artwohl | | A47F 3/0434 349/12 |
| 2015/0338715 A1* | 11/2015 | Schaefer | | G02F 1/13 362/92 |
| 2015/0338913 A1* | 11/2015 | Shigeta | | G06F 3/0488 345/633 |
| 2015/0362954 A1* | 12/2015 | Zohar | | G06F 1/1656 248/51 |
| 2015/0371579 A1* | 12/2015 | Yu | | G09G 3/32 345/690 |
| 2016/0078796 A1* | 3/2016 | Cho | | G09G 3/2003 345/690 |
| 2016/0097962 A1* | 4/2016 | Kim | | G09G 5/10 359/238 |
| 2016/0117022 A1* | 4/2016 | Kim | | G06F 3/044 345/174 |
| 2016/0131420 A1* | 5/2016 | Park | | F25D 29/005 62/56 |
| 2016/0178276 A1* | 6/2016 | Park | | F25D 29/005 345/173 |
| 2016/0178277 A1* | 6/2016 | Park | | F25D 29/005 345/173 |

FOREIGN PATENT DOCUMENTS

| | | |
|---|---|---|
| JP | 5-106962 | 4/1993 |
| JP | H05-106962 A * | 4/1993 |
| JP | 2013-92902 | 5/2013 |
| KR | 1997-0047628 | 7/1997 |
| KR | 10-2013-0115586 | 10/2013 |
| WO | WO 2009/109048 A1 | 9/2009 |
| WO | WO 2009/120474 A2 | 10/2009 |
| WO | WO 2013/020808 A2 | 2/2013 |

* cited by examiner

REFRIGERATOR AND METHOD OF CONTROLLING THE SAME

CROSS-REFERENCE TO RELATED APPLICATIONS

This application claims the benefit of Korean Patent Application No. 10-2014-0038845, filed on Apr. 1, 2014 in the Korean Intellectual Property Office, the disclosure of which is incorporated herein by reference.

BACKGROUND

1. Field

Embodiments of the present disclosure relate to a refrigerator equipped with a display that is capable of being transparently/opaquely converted and a method of controlling the refrigerator.

2. Description of the Related Art

A refrigerator requires insulation from the outside so as to keep food in a state under a predetermined temperature, and to this end, a body of the refrigerator is formed of a material, such as an opaque metal, glass or plastic and thus, an inside of the refrigerator cannot be watched.

In general, a door of the refrigerator needs to be opened so that a state of the inside of the refrigerator can be identified. However, when the door of the refrigerator is frequently opened, an energy loss occurs due to a temperature difference between the inside of the refrigerator and the outside, and cooling efficiency is lowered, and the temperature of the inside of the refrigerator rises while the door of the refrigerator is opened, such that food may spoil.

Also, part of the body or the door of the refrigerator may be transparently implemented so that the state of the inside of the refrigerator can be identified. However, in this case, the inside of the refrigerator is always exposed to the outside, and insulation performance may be lowered.

SUMMARY

Therefore, it is an aspect of the present disclosure to provide a refrigerator in which a display that is capable of being transparently/opaquely converted is disposed in at least one region of a door and an inside of the refrigerator can be identified without opening the door, and a method of controlling the refrigerator.

It is another aspect of the present disclosure to provide a refrigerator in which, when a display disposed at the refrigerator is in an opaque state, the display is capable of displaying a text or an image or a memo is capable of being input to the display from a user, and a method of controlling the refrigerator.

Additional aspects of the disclosure will be set forth in part in the description which follows and, in part, will be apparent from the description, or may be learned by practice of the disclosure.

In accordance with one aspect of the present disclosure, a refrigerator includes a body including a storage chamber; a door that is coupled to the body so as to open/close the storage chamber; a display that is disposed in at least one region of the door and can be converted between a transparent mode and a display mode; and a controller that controls the display to display at least one among a text, an image, and color when the display is in the display mode.

The display may be a reflective display that does not include a light source therein.

The display may include a first electrode; a second electrode; and cholesteric liquid crystals, which are filled between the first electrode and the second electrode and of which states vary according to an electric field applied to the cholesteric liquid crystals.

The display may be converted into an opaque mode in which a memo is input by the cholesteric liquid crystals.

The display may include a first electrode; a second electrode; and photonic crystals, which are filled between the first electrode and the second electrode and of which states vary according to an electric field applied to the photonic crystals.

The display may be converted into a reflection mode in which the display is used as a mirror by the photonic crystals.

The refrigerator may further include an illumination unit disposed in the storage chamber, wherein the controller may control the display to turn on the illumination unit when the display is in a transparent mode.

The refrigerator may further include an input unit to which selection of the transparent mode, the display mode or the opaque mode is input, wherein the controller may control the display to be converted into the transparent mode, the display mode or the opaque mode according to selection input to the input unit.

When the transparent mode is selected, the controller may control the display to transmit light by adjusting voltages applied to the display so that the cholesteric liquid crystals are in a homeotropic state.

When the display mode is selected, the controller may control the display to selectively reflect incident light according to wavelength by adjusting voltages applied to the display so that the cholesteric liquid crystals are in a planar state.

When the opaque mode is selected, the controller may control the display to scatter or diffusedly reflect incident light by adjusting voltages applied to the display so that the cholesteric liquid crystals are in a focal conic state.

The refrigerator may further include an input unit to which selection of the transparent mode, the display mode or the reflection mode is input, wherein the controller may control the display to be converted into the transparent mode, the display mode or the reflection mode according to selection input to the input unit.

The refrigerator may further include an insulation member disposed on a rear surface of the display.

The insulation member may include a first transparent substrate and a second transparent substrate, and a space between the first transparent substrate and the second transparent substrate may be in a vacuum state.

The insulation member may include at least one spacer formed between the first transparent substrate and the second transparent substrate.

The display may display the memo input by a user in the opaque mode.

The input unit may be configured so that selection of reset is further input to the input unit, and the controller may delete the memo displayed on the display when selection of reset is input to the input unit.

The refrigerator may further include a touch panel disposed on a front surface of the display, wherein the memo may be input through the touch panel.

The refrigerator may further include a memory device for storing the input memo.

If a reference time elapses after the display is converted into the transparent mode, the controller may convert the display into the display mode.

The refrigerator may further include a sensing sensor that senses a user's access to the refrigerator, wherein, if the user's access to the refrigerator is sensed, the controller may convert the display into the transparent mode, and if it is sensed that the user is distant from the refrigerator, the controller may convert the display into the display mode.

The refrigerator may further include a circular polarizer or a twisted nematic (TN) liquid crystal disposed on a rear surface of the display.

The circular polarizer may include a quarter wavelength plate and a linear polarizer.

When the cholesteric liquid crystals have a structure in which right hand circular polarized (RCP) light is reflected, the circular polarizer may transmit only RCP light.

When the cholesteric liquid crystals have a structure in which left hand circular polarized (LCP) light is reflected, the circular polarizer may transmit only LCP light.

In accordance with another aspect of the present disclosure, a method of controlling a refrigerator including a display having an operating mode including a transparent mode and a display mode, includes when the display is in the transparent mode, controlling the display to transmit light by adjusting voltages applied to the display; and when the display is in the display mode, controlling the display to display at least one among a text, an image, and color by adjusting voltages applied to the display.

The method may further include receiving selection of the transparent mode or the display mode.

The method may further include, when the display is in the transparent mode, turning on an illumination unit disposed in the refrigerator.

The method may further include sensing user's access to the refrigerator; and if the user's access to the refrigerator is sensed, converting the display into the transparent mode.

The method may further include measuring an operating time of the display in the transparent mode; and if the measured operating time is equal to or greater than a reference time, converting the display into the display mode.

The method may further include, when the display is in an opaque mode, controlling the display to display a memo input by the user, wherein the operating mode may further include the opaque mode.

The method may further include receiving selection of reset; and deleting the memo displayed on the display.

The display may include cholesteric liquid crystals, and the controlling of the display to display at least one among a text, an image, and color may include controlling voltages applied to the display so that the cholesteric liquid crystals are in a planar state.

The display may include cholesteric liquid crystals, and the controlling of the display to transmit light may include controlling voltages applied to the display so that the cholesteric liquid crystals are in a homeotropic state.

The display may include cholesteric liquid crystals, and the controlling of the display to display a memo input by the user may include controlling voltages applied to the display so that the cholesteric liquid crystals are in a focal conic state.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
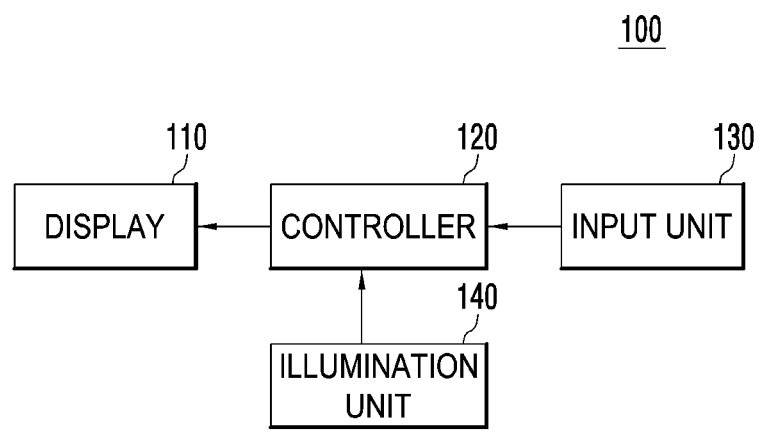
FIG. 1 is a control block diagram of a refrigerator in accordance with an embodiment of the present disclosure.

Reference will now be made in detail to the embodiments of the present disclosure, examples of which are illustrated in the accompanying drawings, wherein like reference numerals refer to like elements throughout.

Figure 2:
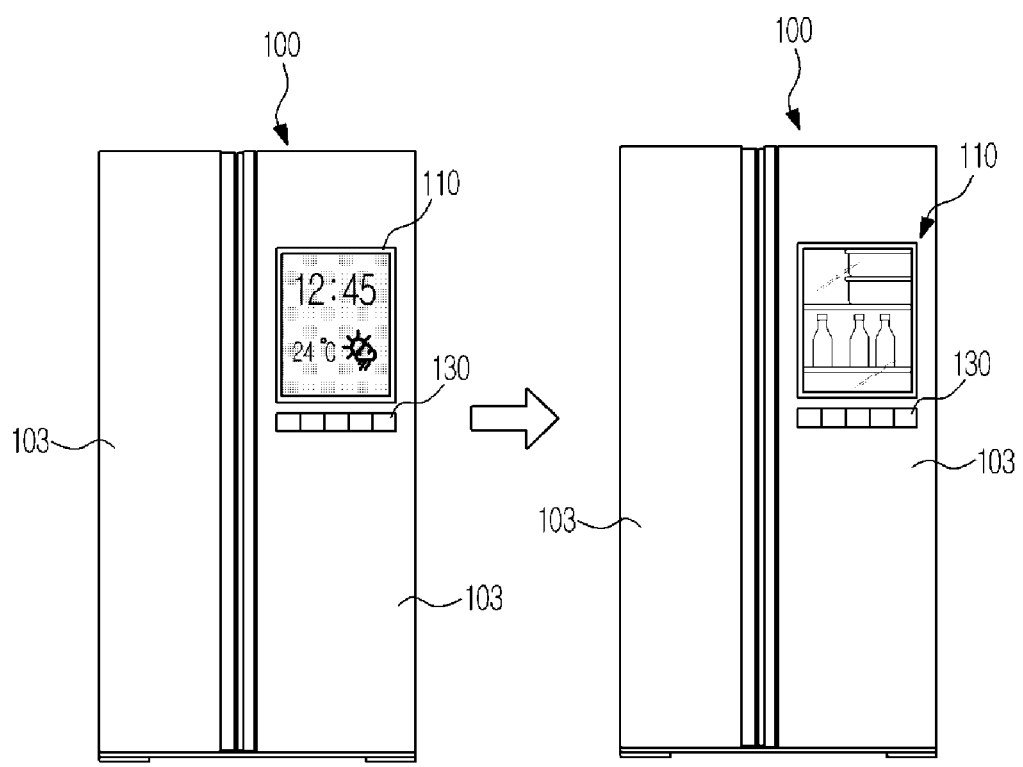
FIG. 2 is a view illustrating an exterior of the refrigerator illustrated in FIG. 1.
Figure 3:
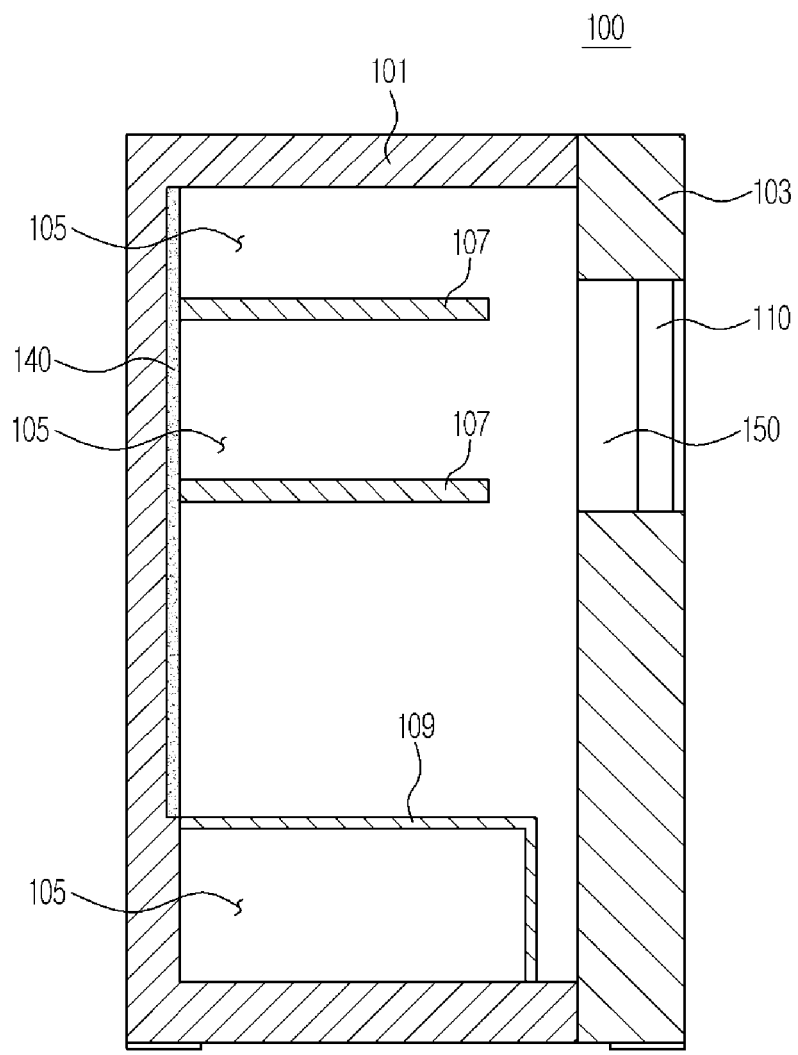
FIG. 3 is a side cross-sectional view of the refrigerator of FIG. 1.

FIG. 1 is a control block diagram of a refrigerator in accordance with an embodiment of the present disclosure, and FIG. 2 is a view illustrating an exterior of the refrigerator illustrated in FIG. 1, and FIG. 3 is a side cross-sectional view of the refrigerator of FIG. 1.

Referring to FIG. 1, a refrigerator 100 in accordance with an embodiment of the present disclosure includes a display 110 that is capable of being converted between a transparent mode and an opaque mode, an input unit 130 to which selection of the transparent mode or the opaque mode is input from a user, a controller 120 that controls the display 110 to be converted between the transparent mode and the opaque mode according to the user's selection, and an illumination unit 140 that is disposed in a storage chamber in the refrigerator 100 and turned on when the display 110 is in the transparent mode.

Referring to FIGS. 2 and 3, a body 101 constitutes an exterior of the refrigerator 100, and a storage chamber 105 that may accommodate food, is disposed in the body 101, and the storage chamber 105 may be partitioned off into a plurality of spaces by a shelf 107 or barrier walls 109 formed in the body 101.

A door 103 is mounted on a front surface of the body 101. The door 103 may be rotatably coupled to one side of the body 101 and may be opened or closed. As illustrated in FIG. 2, the refrigerator 100 may be implemented as a refrigerator having a side-by-side door in which two doors 103 are coupled to right and left sides of the body 101, respectively. However, embodiments of the refrigerator 100 are not limited thereto, and there are no limitations in the number or positions of the doors 103.

At least one illumination unit 140 is mounted on inner walls of the body 101 so that, when the user takes out an object from the storage chamber 105, the user can see the object well. The at least one illumination unit 140 may be implemented as at least one among light sources including a light emitting diode (LED) lamp, an incandescent lamp, a halogen lamp, and a fluorescent lamp.

The at least one illumination unit 140 may be automatically turned on when the door 103 is opened. The at least one illumination unit 140 may be automatically turned off when the door 103 is closed. Although not shown in the drawing, a sensor that senses opening/closing of the door 103 in a contact manner or in a non-contact manner may be mounted on the refrigerator 100, and the controller 120 may turn on the illumination unit 140 when output signals of the sensor represent opening of the door 103, and the controller 120 may turn off the illumination unit 140 when output signals of the sensor represent closing of the door 103.

The illumination unit 140 may be mounted on a rear side of the body 101 that faces the door 103, as illustrated in the example of FIG. 3. However, embodiments of the refrigerator 100 are not limited thereto, and the illumination unit 140 may be mounted in other regions of the inner walls of the body 101 and may also be mounted in two or more regions.

The display 110 that is capable of being converted between the transparent mode and the opaque mode is disposed in at least one region of the door 103, and the input unit 130 to which selection of the transparent mode or the opaque mode is input from the user, is disposed in another one region or in the same one region of the door 103. The input unit 130 may be implemented using a hard key method or a touch pad method and may also be implemented as a touch panel mounted on a front surface of the display 110.

The display 110 may be implemented as a reflective display. The reflective display that is a display capable of displaying information using external light without including an additional light source in the display, has a memory characteristic and thus may be driven with low power.

Light reflectance or transmittance varies according to a magnitude of a voltage or an electric field applied to the reflective display. Thus, the controller 120 may control an output mode of the display 110 by adjusting the voltage applied to the display 110. An operating mode of the display 110 may be largely classified into a transparent mode and a display mode and may further include an opaque mode in which a memory is received and is displayed according to the type of the display, or a reflection mode in which the display operates as a mirror.

When light transmittance of the display 110 is reduced and the display 110 is in a display mode, the display 110 may display date, time, weather, status information of food accommodated in the storage chamber 105, a personal schedule, and information regarding settings of the refrigerator 100 as a text or an image or may display an image or color for an interior effect by selectively reflecting light having a predetermined wavelength, as illustrated on the left of FIG. 2.

When light transmittance of the display 110 is increased and the display 110 is converted into the transparent mode, an inside of the body 101 can be watched to the outside through the transparent display 110, as illustrated on the right of FIG. 2.

A basic state, i.e., a basic operating mode of the display 110 may be set as a display mode. In this case, when the display 110 displays a text, an image or color at normal times and the user selects the transparent mode using the input unit 130, the display 110 may be transparently converted, and the inside of the body 101 can be watched.

However, another operating mode may be set as the basic operating mode of the display 110 and may be set and changed by the user. Thus, when the basic operating mode is set as the transparent mode, the display 110 is present in the transparent state at normal times, and when the user selects the display mode using the input unit 130, the display 110 may display at least one among a text, an image, and color.

After the operating mode of the display 110 is converted into another operating mode from the basic operating mode, the display 110 can be maintained in a state in which it is converted into a current operating mode, until conversion of the basic operating mode is selected or conversion into another operating mode is selected.

Alternatively, although the user's selection is not input if a predetermined reference time elapses, the display 110 can be automatically converted into the basic operating mode. In this case, it is obvious that, even though the reference time does not elapse and if the user' selection is input, the display 110 may be converted into the basic operating mode.

Alternatively, if the user's selection is not input until the predetermined reference time elapses after the display 110 is converted into another mode from an arbitrary operating mode, the display 110 may be automatically converted into its original operating mode, i.e., into an operating mode at the time when it is converted into a current operating mode or may also be converted into the basic operating mode.

Alternatively, when the refrigerator 100 further includes a sensing sensor that senses the user's access to the refrigerator 100 and the user's access to the refrigerator is sensed, if it is determined that the display 110 is converted into the transparent mode from an arbitrary operating mode and the user is distant from the refrigerator 100, the display 110 may be returned to the operating mode at the time when it is converted into the transparent mode. Also, even though the user is not distant from the refrigerator 100, the display 110 may be automatically converted into its original operating mode after a predetermined reference time elapses. Here, the original operating mode may be a display mode, an opaque mode or a reflection mode.

An ultrasonic sensor or an infrared sensor may be used as the sensing sensor that senses the user's access to the refrigerator, and the user's access and separation to/from the refrigerator may be determined by a predetermined reference distance.

The text, the image or the color displayed by the display 110 may be previously stored in a memory device disposed at the refrigerator 100 or may be input from an external device.

Here, the memory device disposed at the refrigerator 100 may be at least one among various memory devices, such as flash memory, a hard disk, a memory card, such as a secure digital (SD) card or an XD card, random access memory (RAM), static random access memory (SRAM), read-only memory (ROM), electrically erasable programmable read-only memory (EEPROM), programmable read-only memory (PROM), a magnetic memory, a magnetic disk, and an optical disk.

Also, the external device that inputs a text, an image or color to the memory device disposed at the refrigerator 100 may be an electronic device, such as a smartphone or a personal computer (PC). These electronic devices may input the text or image using wireless communication or an interface disposed at the refrigerator 100.

Wireless communication used to input the text or image may be at least one among communication methods, such as Zigbee, near field communication (NFC), Bluetooth, wireless-fidelity (Wi-Fi), and radio frequency identification (RFID). The interface may be at least one among an wired/wireless headset port, an external charger port, a wired/wireless data port, a memory card port, a port that connects a device including an identification module, an audio input/output (I/O) port, and a video I/O port.

In the refrigerator 100, an insulation member 150 illustrated in FIG. 3 may be mounted on the rear side of the display 110 so as to prevent external cold air from flowing into the body 101 using the display 110. Hereinafter, a structure of the insulation member 150 will be described with reference to FIG. 4.

Figure 4:
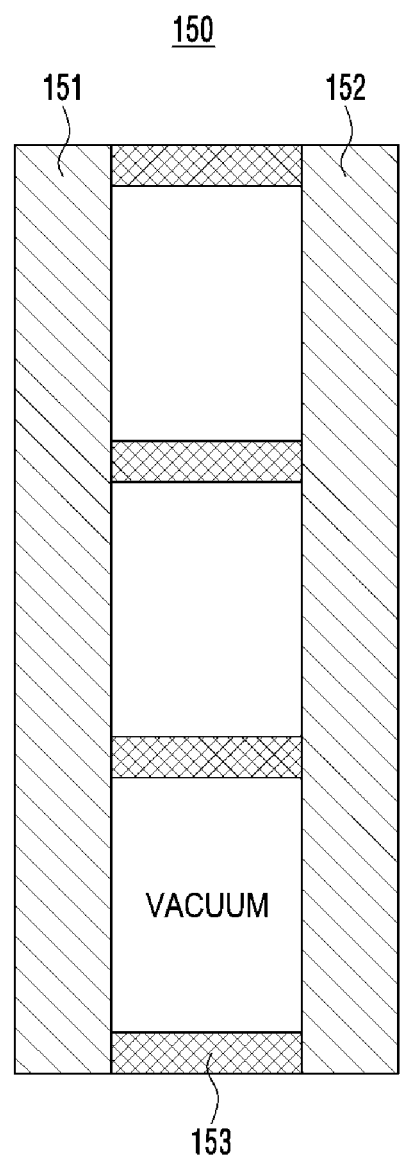
FIG. 4 is a cross-sectional view of an insulation member mounted on the refrigerator of FIG. 1.

FIG. 4 is a cross-sectional view of the insulation member mounted on the refrigerator of FIG. 1.

Referring to FIG. 4, the insulation member 150 includes a first substrate 151 and a second substrate 152, and a space between the first substrate 151 and the second substrate 152 is in a vacuum state. The first substrate 151 and the second substrate 152 may be implemented as transparent glass or transparent plastic. A plurality of spacers 153 are disposed between the first substrate 151 and the second substrate 152 so that a predetermined distance between two substrates 151 and 152 can be maintained and the two substrates 151 and 152 can be prevented from being bent due to vacuum.

Figure 5:
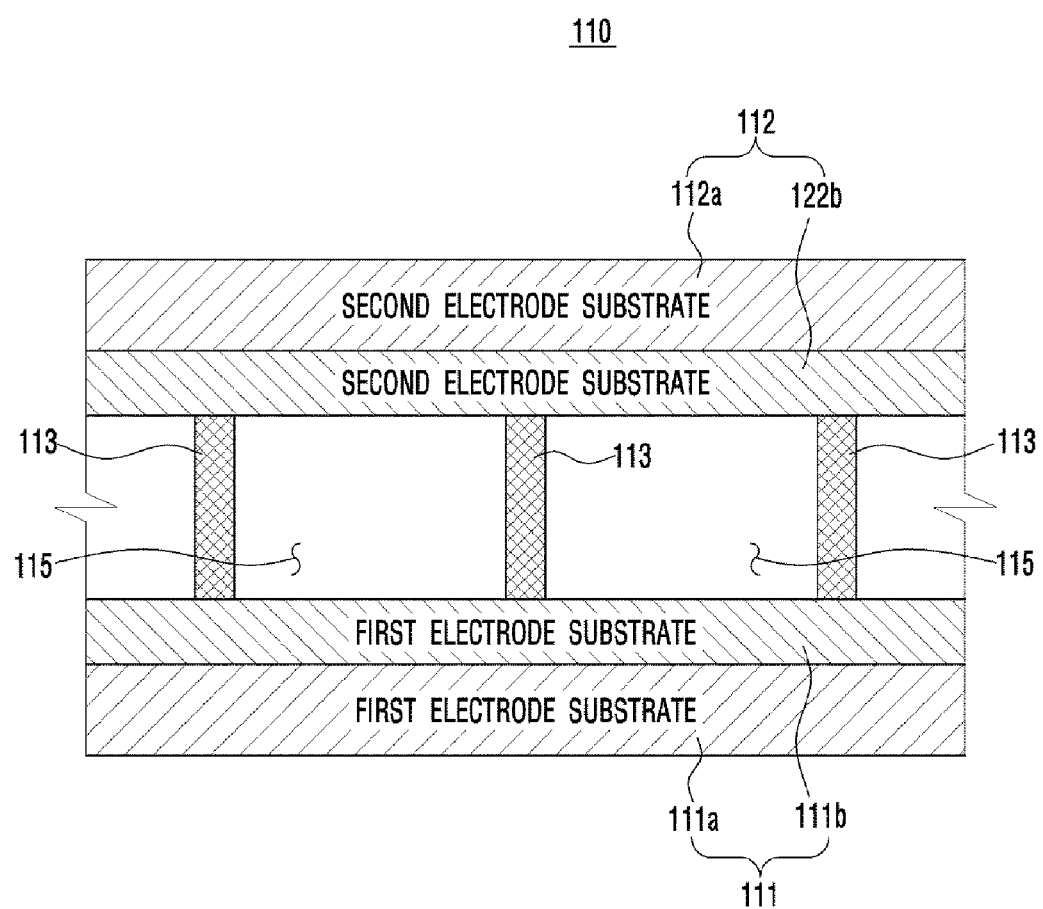
FIG. 5 is a cross-sectional view of a display used in the refrigerator of FIG. 1.
Figure 6:
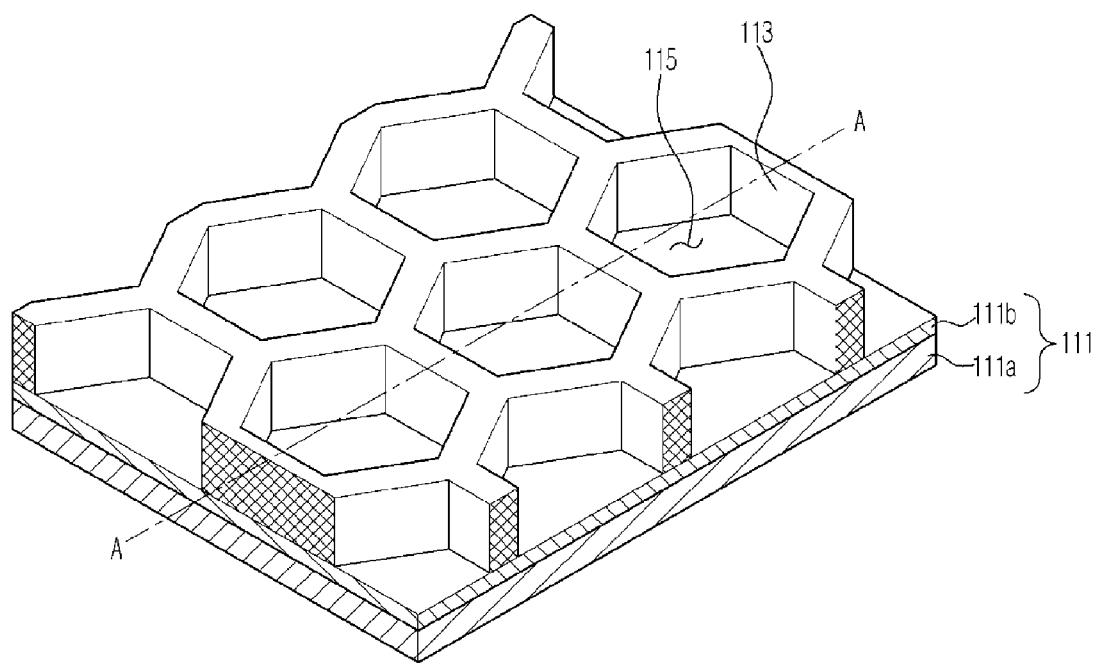
FIGS. 6 and 7 are perspective views for describing an example of barrier walls formed on a first electrode module.
Figure 7:
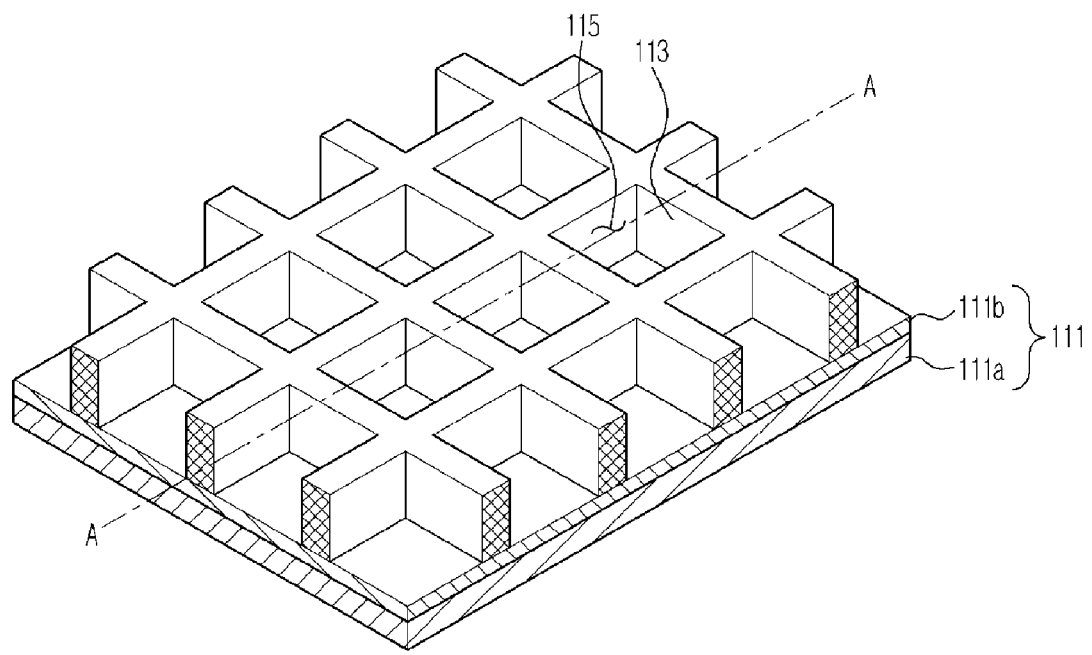

FIG. 5 is a cross-sectional view of a display used in the refrigerator of FIG. 1, and FIGS. 6 and 7 are perspective views for describing an example of barrier walls formed on a first electrode module.

Referring to FIG. 5, the display 110 includes a first electrode module 111, a second electrode module 112, and barrier walls 113 formed between the first electrode module 111 and the second electrode module 112.

The first electrode module 111 includes a first electrode substrate 111*a* and a first electrode 111*b*, and the first electrode 111*b* is formed on the first electrode substrate 111*a*.

The second electrode module 112 includes a second electrode substrate 112*a* and a second electrode 112*b*, and the second electrode 112*b* is formed on the second electrode substrate 112*a*.

The first electrode substrate 111*a*, the first electrode 111*b*, the second electrode substrate 112*a*, and the second electrode 112*b* may be transparently implemented. Thus, in detail, the first electrode substrate 111*a* and the second electrode substrate 112*a* may be implemented as transparent glass or transparent plastic. For example, plastic may be one material selected from the group consisting of silicon, silicon oxide, silicon carbide, polyethylene terephthalate (PET), and polyethylene naphthalate (PEN). When the first electrode substrate 111*a* and the second electrode substrate 112*a* are implemented as transparent plastic, they may have a smaller thickness and a smaller weight than that of a glass substrate and may have flexibility. When the first electrode substrate 111*a* and the second electrode substrate 112*a* have flexibility, more varied designs can be implemented.

The barrier walls 113 are formed between the first electrode module 111 and the second electrode module 112, and a space 115 between the first electrode module 111 and the second electrode module 112 is partitioned off by the barrier walls 113. A plurality of barrier walls 113 may be formed and may partition off the space between the first electrode module 111 and the second electrode module 112 into a plurality of individual spaces 115. The plurality of individual spaces 115 partitioned off by the barrier walls 113 may be called by various terms, such as micro cups, u-cups, cavities, and cells. However, in the following embodiment that will be described in detail, the spaces partitioned off by the barrier walls 113 are referred to as cells 115.

The cells 115 formed by a plurality of barrier walls 113 may have a hexagonal shape, as illustrated in FIG. 6, and may have a rectangular shape, as illustrated in FIG. 7. A cross-section taken along line A-A' of FIGS. 6 and 7 becomes a cross-sectional view of FIG. 5.

However, each of the cells 115 may have a polygonal shape except for a rectangular shape or a hexagonal shape, a circular shape or an arbitrary shape except for the polygonal and circular shapes. Also, each cell 115 may have a combination of different shapes.

When voltages are applied to the first electrode 111*b* and the second electrode 112*b*, an electric field is formed in each of the cells 115. Thus, in the embodiment of the present disclosure, applying voltages and applying the electric field are used in the same meaning. An electric field dependent layer (see 117 of FIG. 8), of which a characteristic varies due to the electric field, is formed on each cell 115, and the display 110 may display at least one among a text, an image, and color using a change of characteristics of the electric field dependent layer or may serve as a window that shows a rear space.

The electric field dependent layer is formed by filling an electric field dependent material, of which a characteristic varies due to the electric field, in each cell 115. Thus, FIGS. 5 through 7 do not illustrate the electric field dependent material filled in each cell 115, which will be described later in detail.

As illustrated in FIGS. 5 through 7, when the space between the first electrode module 111 and the second electrode module 112 is partitioned off into a cell shape by the barrier walls 113, an electric field formed in each cell 115 can be prevented from affecting the electric field dependent layer of the adjacent cell 115, and a mutual influence of the electric field dependent layer filled in each cell 115 can be reduced.

Also, when the electric field dependent layer is a liquid crystal layer, even though external deformation or shock is present, external deformation or shock does not affect liquid crystal molecules in each cell 115 so that a problem of stability against shock of the display can be fundamentally solved and simultaneously, a plastic film liquid crystal display having the same characteristics as those of a glass liquid crystal display can be implemented.

Figure 8:
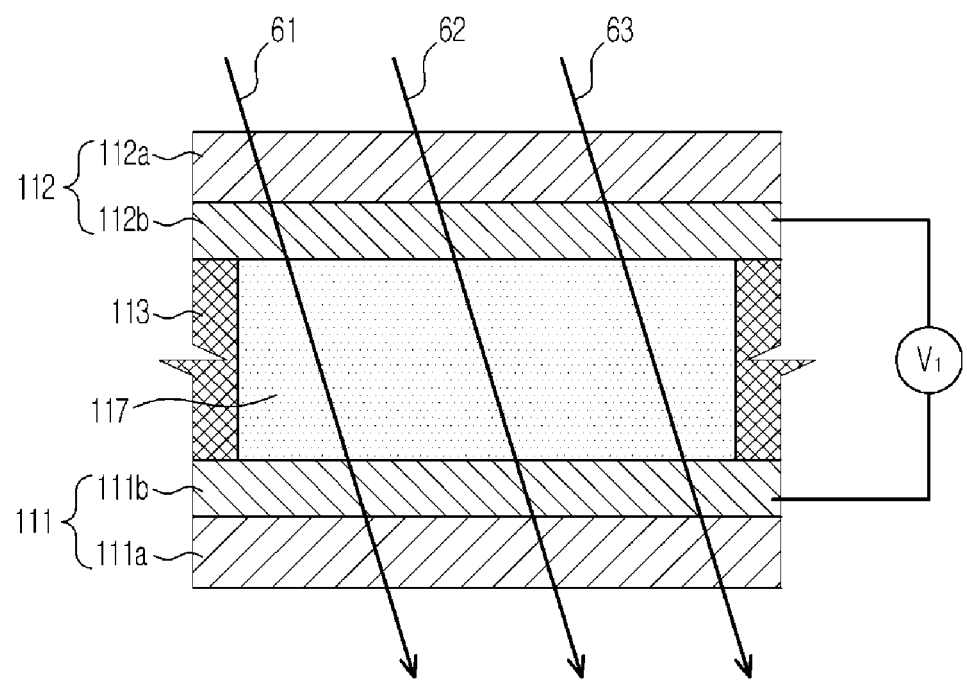
FIGS. 8 through 10 schematically illustrate a principle in which color displayed on a display varies according to voltages applied to a first electrode and a second electrode.
Figure 9:
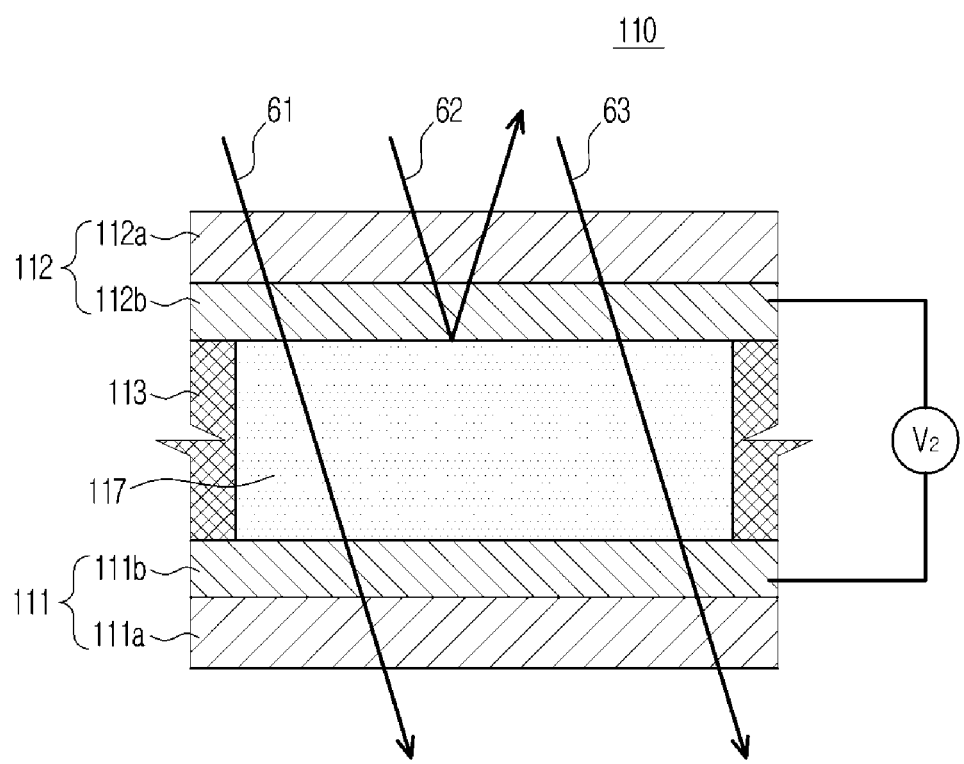
Figure 10:
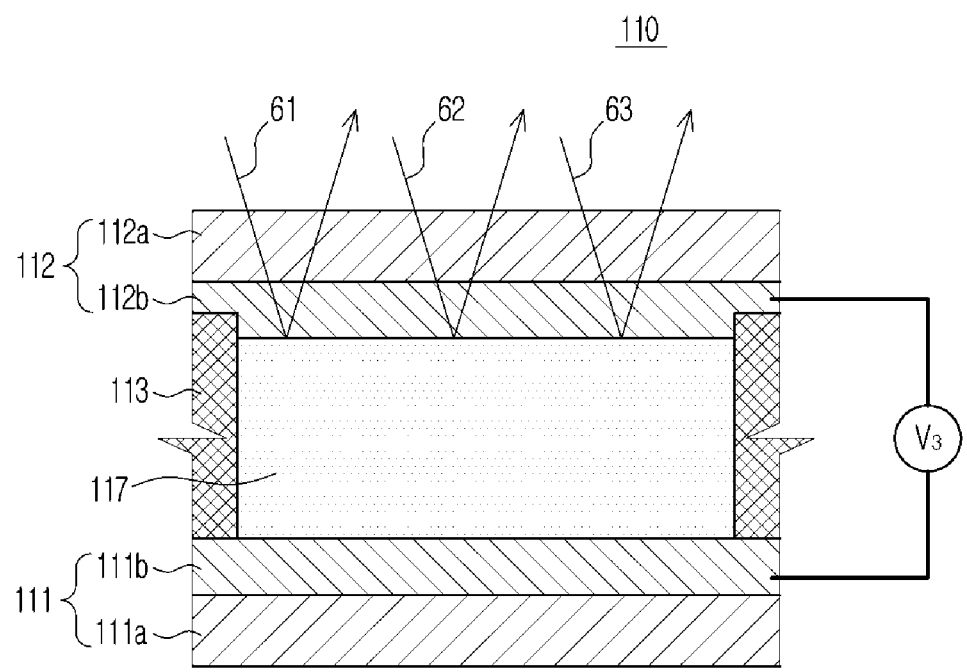

FIGS. 8 through 10 schematically illustrate a principle in which color displayed on a display varies according to voltages applied to a first electrode and a second electrode.

In general, light that is incident from the external light source, includes light having all wavelengths in a visible light band. However, in the current embodiment, for convenience of explanation, light that is incident from the external light source includes lights 61, 62, and 63 having three different wavelengths.

Referring to FIG. 8, when a particular voltage $V_1$ is applied to the first electrode 111*b* and the second electrode 112*b*, three lights 61, 62, and 63 having different wavelengths may not be reflected but may be transmitted through an electric field dependent layer 117. Thus, the display 110 has a transparent state.

Referring to FIG. 9, when another particular voltage $V_2$ is applied to the first electrode 111b and the second electrode 112b, one light 62 among the three lights 61, 62, and 63 may be reflected, and the other lights 61 and 63 may not be reflected. In this case, color of a wavelength of the reflected light 62 is displayed on the second electrode substrate 112b.

Referring to FIG. 10, when another particular voltage $V_3$ is applied to the first electrode 111b and the second electrode 112b, all of the three lights 61, 62, and 63 may be reflected, and when the second electrode substrate 112b is implemented flat, the second electrode substrate 112b may be viewed as a mirror to the user. In particular, when the electric field dependent layer 117 is formed of photonic crystals, the display 110 may operate, as illustrated in FIG. 10.

Since magnitudes of the particular voltages $V_1$, $V_2$, and $V_3$ vary according to the configuration of the electric field dependent layer 117, the configuration of the electric field dependent layer 117 will be described later.

In the examples of FIGS. 8 through 10, only the first electrode module 111 and the second electrode module 112 that correspond to one cell 115 are illustrated. However, an electric field formed in each cell 115 may be independently controlled so that each cell 115 may display color independently.

The display 110 may be driven using a passive matrix method or an active matrix method.

Figure 11:
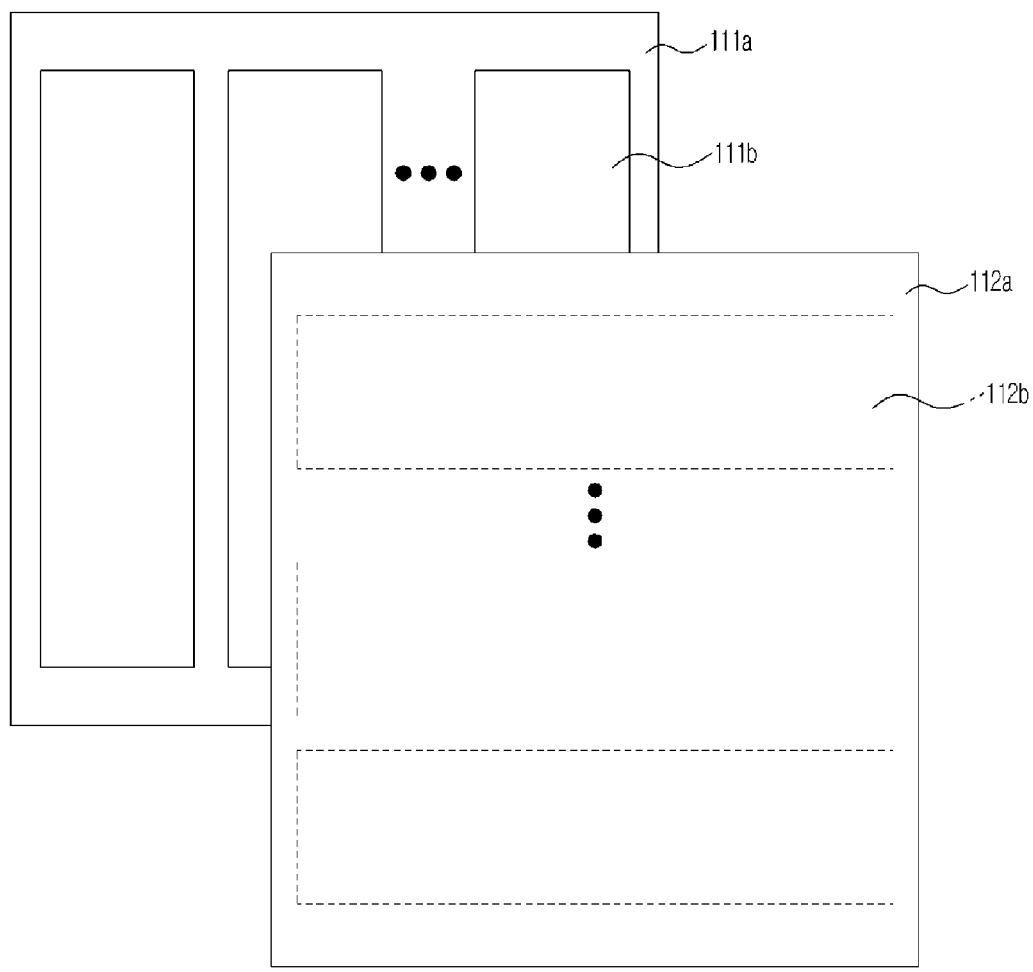
FIG. 11 is a plan view for describing a mutual position relationship between the first electrode and the second electrode when the display is driven using a passive matrix method.

FIG. 11 is a plan view for describing a mutual position relationship between the first electrode and the second electrode when the display is driven using a passive matrix method.

As described above, the first electrode 111b is formed on the first electrode substrate 111a, and the second electrode 112b is formed on the second electrode substrate 112a. As illustrated in FIG. 11, the first electrode module 111 and the second electrode module 112 are coupled to each other so that the first electrode 111b and the second electrode 112b can cross each other in a vertical direction. In this case, a crossing portion constitutes one pixel. Thus, when voltages are applied to the first electrode 111b and the second electrode 112b corresponding to a desired pixel, the pixel can be controlled.

When the display 110 is driven using the active matrix method, a switching device, such as a transistor, is disposed in each pixel, and the transistor can adjust brightness of each pixel rapidly so that a response speed is fast and an image having high resolution can be implemented.

When the display 110 is driven using the passive matrix method, no switching device is required in each pixel so that a manufacturing process can be simplified and transmittance of the display 110 can be improved. Also, it is easy to perform driving control in each pixel.

As mentioned above, the display 110 may be implemented as a reflective display that displays at least one among a text, an image, and color using external light without including an additional light source in the refrigerator 100. To this end, the electric field dependent layer 117 is formed on each cell 115. Thus, the electric field dependent layer 117 may be formed by filling an electric field dependent material in each cell 115.

The electric field dependent material is a material, of which characteristics vary due to the electric field formed between the first electrode 111b and the second electrode 112b and may be at least one selected from the group consisting of a liquid crystal material, a fluorescent material, a photonic crystal material, an electrophoresis material, and an electrowetting material.

Here, the electrophoresis material is a material that represents an electrophoresis phenomenon, and the electrowetting material is a material that represents an electrowetting phenomenon, and a photoelectric discoloration material is a material that represents a photoelectric discoloration phenomenon.

When briefly describing several electric field dependent materials, photonic crystals have a structure in which a photonic band gap is formed by regular arrangement of a fine structure that is spatially repeated and only a particular wavelength of external incident light is reflected, and color that is expressed by the photonic crystals is referred to as structure color.

Formation of the photonic band gap is determined by the size of particles that constitute the photonic crystals, a distance between the particles, and a refractive index difference. Thus, expressed color can be adjusted by varying characteristics of the photonic crystals by adjusting an intensity or direction of an electric field.

The electrophoresis phenomenon is a phenomenon in which filled particles are moved by an electric field formed between two electrodes. By dispersing the filled particles with color into a fluid having high resistance and low viscosity and applying voltages to two electrodes, color can be displayed while the filled particles are moved.

The display using an electrowetting method employs a principle in which a conductive fluid (water) and a non-conductive fluid (oil) are not mixed with each other. When surface tension of the conductive fluid is controlled by applying a voltage to the conductive fluid from an outside, a contact angle of the conductive fluid and a shape of an interface of two fluids vary, and a wavelength of reflected light varies.

Any one of the electric field dependent material may be used in the current embodiment of the refrigerator 100. However, in the following embodiment that will be described later, a cholesteric liquid crystal material among liquid crystal materials that may implement excellent light transmittance may be used as the electric field dependent material.

Figure 12:
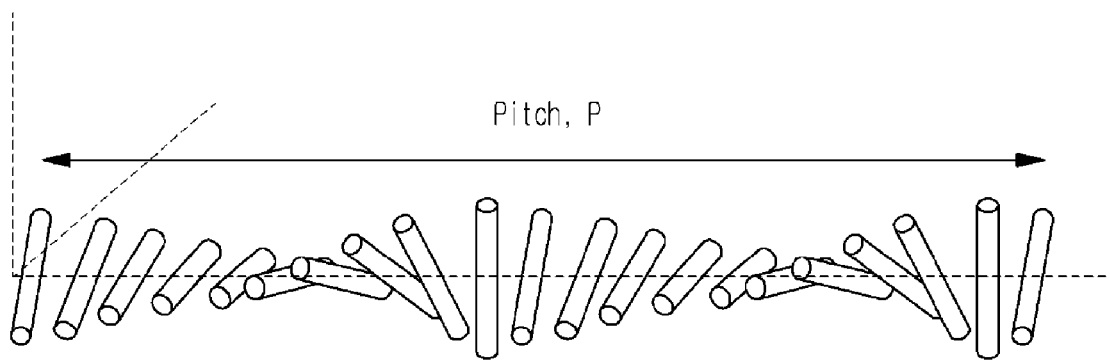
FIG. 12 illustrates a structure of cholesteric liquid crystals.
Figure 13:
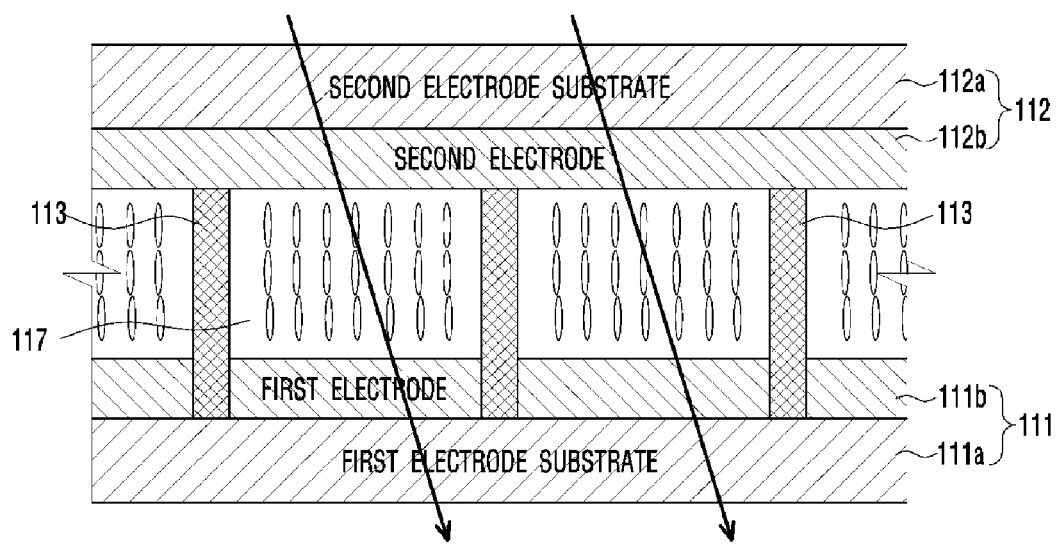
FIGS. 13 through 15 are cross-sectional views for describing different states of the cholesteric liquid crystals of the display in which the cholesteric liquid crystals are filled in a cell.
Figure 14:
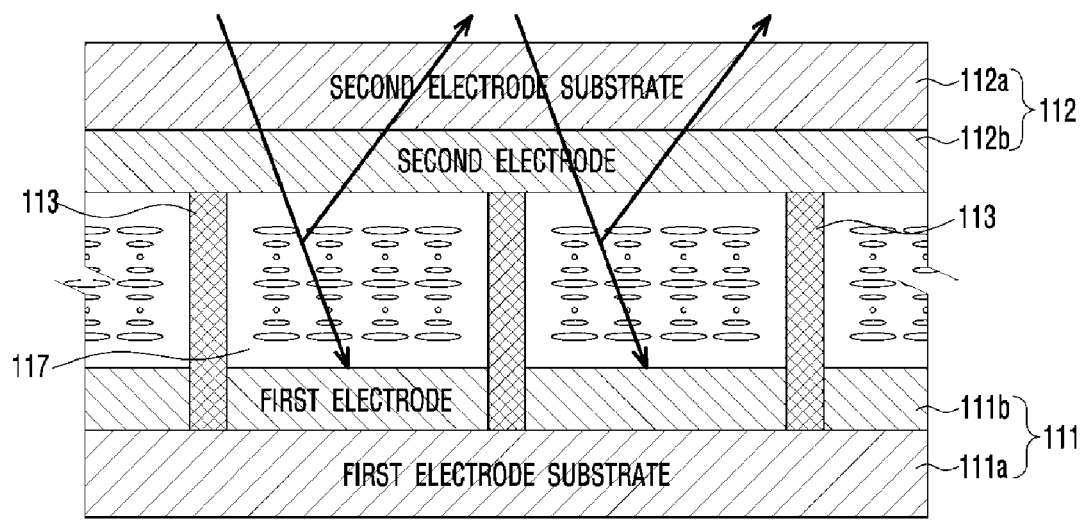
Figure 15:
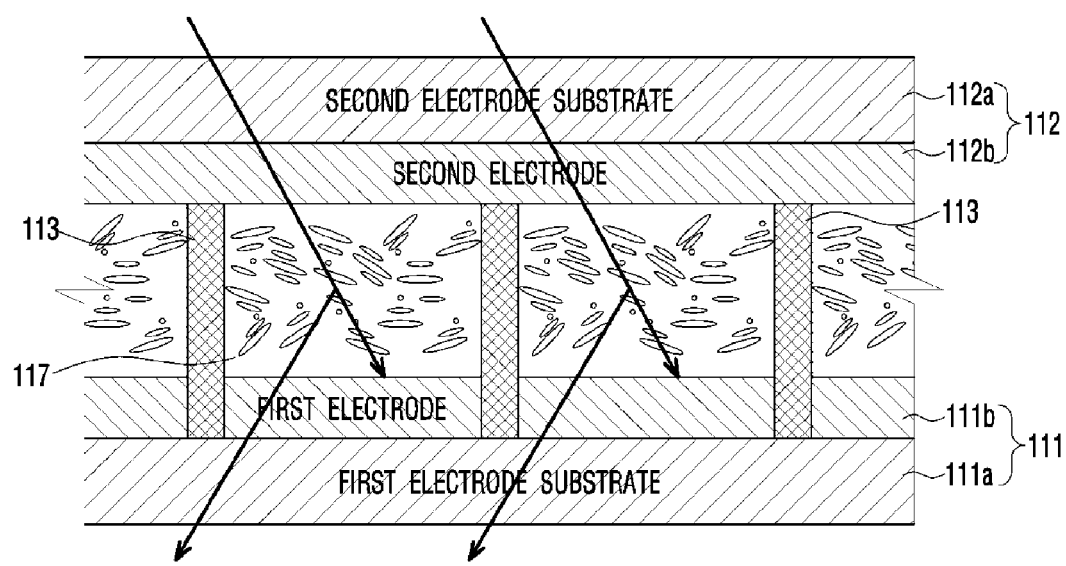

FIG. 12 illustrates a structure of cholesteric liquid crystals, and FIGS. 13 through 15 are cross-sectional views for describing different states of the cholesteric liquid crystals of the display in which the cholesteric liquid crystals are filled in a cell.

A structure of the cholesteric liquid crystals repeats twisting of molecules at regular intervals. In this case, a repeated length is referred to as a pitch p, and the cholesteric liquid crystals have a characteristic in which light is selectively reflected according to a twisting direction of a helix and the pitch p of the repeated structure.

Since a reflective wavelength band is defined by the pitch p, a wavelength $\lambda$ in which maximum reflection occurs, is defined as $\lambda = n \cdot p$ when an average refractive index of cholesteric liquid crystal molecules is n based on the Bragg rule.

A chiral dopant may be added to the cholesteric liquid crystals so that the cholesteric liquid crystals have a helical structure, and the pitch p is adjusted according to the content of the chiral dopant. As the content of the chiral dopant is increased, the pitch p is decreased, and the reflective wavelength band is lowered.

Thus, a particular wavelength in a visible light region among external light incident onto the cholesteric liquid crystals is reflected by artificially adjusting chiral characteristics so that color can be implemented or transmittance of incident light is increased and thus the display 110 can be transparently implemented.

The cholesteric liquid crystals have bistability in which the cholesteric liquid crystals may be present in two stable states, such as a planar state in which light is reflected even when no electric field is applied to the cholesteric liquid crystals and a focal conic state in which light is scattered. By applying a sufficient electric field to the cholesteric liquid crystals, the cholesteric liquid crystals may be in a homeotropic state in which light may be transmitted.

In this way, an appropriate electric field is applied to the cholesteric liquid crystals or the applied electric field is removed so that the cholesteric liquid crystals can be in a desired state by switching two stable states of the focal conic state and the planer state.

In the examples of FIGS. 13 through 15, the electric field dependent layer 117 is a cholesteric liquid layer, and the cholesteric liquid layer 117 may include a nematic liquid crystal, a chiral dopant, and a photopolymerization polymer. When the chiral dopant induces a periodic helical structure into the nematic liquid crystal, the photopolymerization polymer fixes a helical pitch on the cholesteric liquid crystals.

Also, although not shown in the drawing, orientation films for orientation of a liquid crystal may be disposed on an upper part of the first electrode 111b and a lower part of the second electrode 112b, respectively.

FIG. 13 illustrates arrangement of liquid crystals in a homeotropic state. In the liquid crystals in the homeotropic state, a helical structure is untwisted, and liquid crystal molecules are arranged in a direction of an electric field. The arrangement of the liquid crystals in the homeotropic state is arrangement that is formed when a high electric field is formed between the first electrode 111b and the second electrode 112b and that has a characteristic in which light is transmitted.

FIG. 14 illustrates arrangement of liquid crystals in a planar state. The planar state is a state in which helical axes of cholesteric liquid crystals are arranged substantially perpendicular to a substrate, for example, the first electrode substrate 111b. The liquid crystal layer 117 in the planar state has arrangement that is formed when the high electric field applied to the liquid crystals in the homeotropic state is rapidly lowered, and when the cholesteric liquid crystals is in the planar state, light having a particular wavelength among incident light can be reflected.

In this case, the particular wavelength is determined according to a helical pitch of the helical structure of the cholesteric liquid crystals. That is, since the wavelength of the reflected light may be determined by adjusting the helical pitch, reflected color can be adjusted by adjusting the helical pitch of the cholesteric liquid crystals. Thus, desired color can be displayed without including an additional color filter.

FIG. 15 illustrates arrangement of liquid crystals in a focal conic state. The focal conic state is a state in which helical axes of the cholesteric liquid crystals are arranged substantially parallel to the first electrode substrate 111a. The structure of the liquid crystals in the focal conic state has arrangement that is formed when the high electric field applied to the liquid crystals in the homeotropic state is slowly lowered and that has a characteristic in which light is scattered or diffused reflected. The focal conic state is also referred to as an opaque state.

For example, when an electric field is applied to the cholesteric liquid crystals in the planar state, the helical axes that are perpendicular to the first electrode substrate 111a are changed into being parallel to the first substrate 111a, and the cholesteric liquid crystals are in the focal conic state. For example, the electric field applied to the cholesteric liquid crystals may be 10 to 20 V.

When a larger electric field is applied to the cholesteric liquid crystals in the focal conic state, the cholesteric liquid crystals are in the homeotropic state in which the helical structure is untwisted and liquid crystal molecules are arranged in a direction of the electric field. For example, the electric field applied to the cholesteric liquid crystals may be 30 to 50 V. When the electric field is slowly removed in the homeotropic state, the cholesteric liquid crystals may be returned to the focal conic state, and when the electric field is rapidly removed in the homeotropic state, the cholesteric liquid crystals may be in the planar state.

On the other hand, in order to convert the cholesteric liquid crystals in the focal conic state into the planar state, as described above, two operations in which the cholesteric liquid crystals are in the homeotropic state by applying a larger electric field to the cholesteric liquid crystals and the electric field is rapidly removed, may be undergone.

Thus, when the user selects a transparent mode, the cholesteric liquid crystals are made in the homeotropic state by applying high voltages to the first electrode 111b and the second electrode 112b. When the user selects an opaque mode or display mode in the homeotropic state of the cholesteric liquid crystals, the high electric field formed in each cell 115 may be slowly or rapidly removed so that the cholesteric liquid crystals can be made in the focal conic state or the planar state.

As described above, the cholesteric liquid crystals have a selective reflection characteristic in which only light having a particular wavelength among incident light is selectively reflected according to the helical pitch. In this case, a polarized state of reflected light is determined according to a twisting direction of the helix. For example, when liquid crystal molecules are rotated counterclockwise along the helical axis and have a left handed structure, only left hand circular polarized (LCP) light is reflected in corresponding color, and when the liquid crystal molecules are rotated clockwise along the helical axis and have a right handed structure, only right hand circular polarized (RCP) light is reflected in corresponding color.

In one embodiment of the refrigerator 100, a polarizer or a twisted nematic (TN) liquid crystal is disposed on a rear surface of the display 110 so that internal re-reflection of incident light is blocked and contrast between the transparent mode and the display mode or the opaque mode can be improved.

Figure 16:
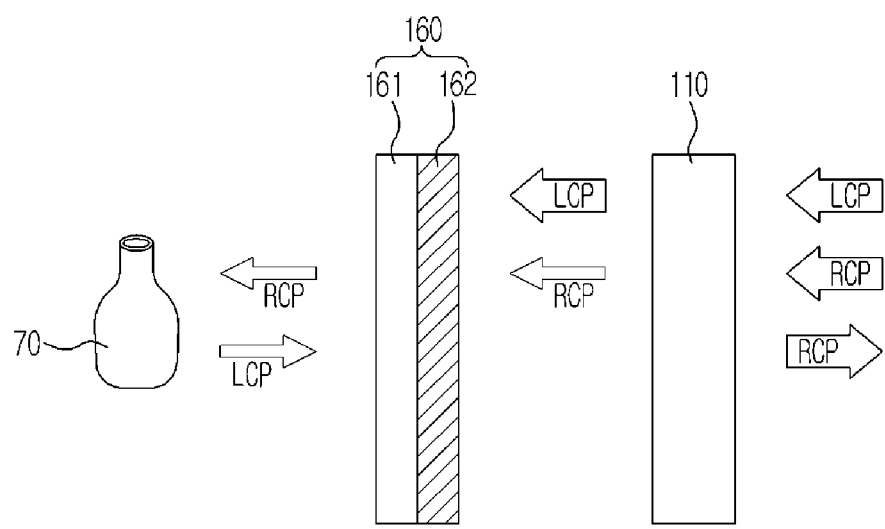
FIGS. 16 and 17 are views for describing an operation in which a polarizer transmits light transmitted through the display.
Figure 17:
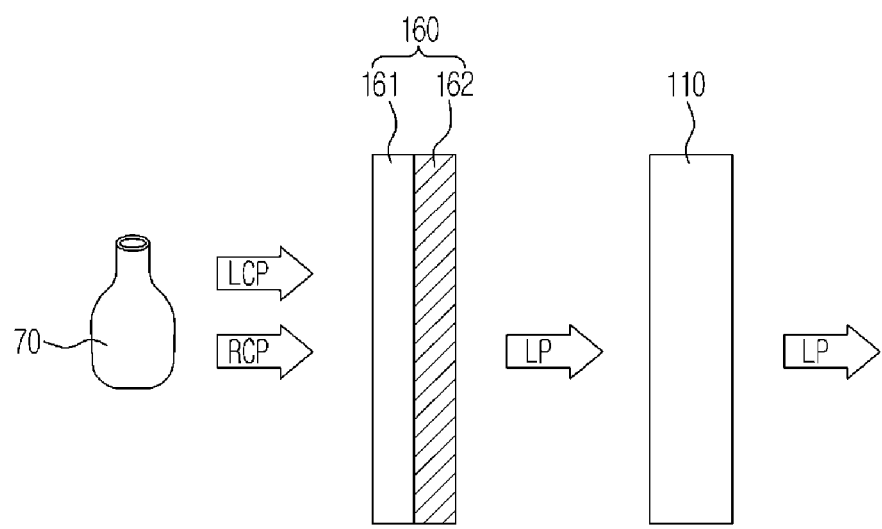

FIGS. 16 and 17 are views for describing an operation in which a polarizer transmits light transmitted through the display.

As illustrated in the example of FIG. 16, when cholesteric liquid crystals have a structure in which RCP light is reflected, in the display mode or the opaque mode, a polarizer 160 that transmits only the RCP light, is disposed on the rear surface of the display 110. The polarizer 160 may be formed of a combination of a quarter wavelength plate 161 and a linear polarizer 162, which is also referred to as a circular polarizer.

In the example of FIG. 16, in order to describe light that transmits through the display 110 and light that transmits through the polarizer 160, the display 110 and the polarizer 160 are separated from each other. However, in actuality, the polarizer 160 in a film shape may be attached to the display 110.

Referring to FIG. 16, LCP light among external incident light may transmit through the display 110, and part of the RCP light may also transmit through the display 110. The polarizer 160 disposed on the rear surface of the display 110 causes the RCP light that transmits through the display 110, to be transmitted, and causes the LCP light not to be transmitted.

The RCP light that transmits through the polarizer 160 collides with an object 70 inside the body 101 and is returned and is transformed into the LCP light. Since the LCP light does not transmit through the polarizer 160, internal re-reflection of external incident light can be blocked.

FIG. 17 illustrates a case where the display 110 is in the transparent mode, i.e., in a state in which the cholesteric liquid crystals are in the homeotropic state. In this case, the helical structure of the cholesteric liquid crystals is untwisted, and all parts of light are transmitted through the display 110. Since the display 110 is in the transparent mode, the illumination unit 140 mounted in the body 101 is turned on, and light emitted from the illumination unit 140 is reflected from the object 70 that is present in the body 101.

LCP light of LCP light and RCP light reflected from the object 70 does not transmit through the polarizer 160, and only the RCP light transmits through the polarizer 160. The RCP light is transformed into linearly-polarized light while transmitting through the polarizer 160, transmits through the display 110 and is seen by the user.

That is, when the refrigerator 100 includes the polarizer 160, a capability in which the display 110 selectively reflects light in the display mode or opaque mode, is improved, and a difference in operations between the display mode or opaque mode and the transparent mode can be clearly shown.

On the other hand, when the cholesteric liquid crystals have a structure in which the LCP light is reflected, the polarizer 160 that transmits only the LCP light may be disposed on the rear surface of the display 110.

As described above, the cholesteric liquid crystals may be present in three states, such as the homeotropic state, the planar state, and the focal conic state. Thus, when the display 110 includes the cholesteric liquid crystals, voltages applied to the first electrode 111b and the second electrode 112b are adjusted so that, when the cholesteric liquid crystals are made in the focal conic state, the display 110 may be converted into the opaque mode and can perform a memo function.

Figure 18:
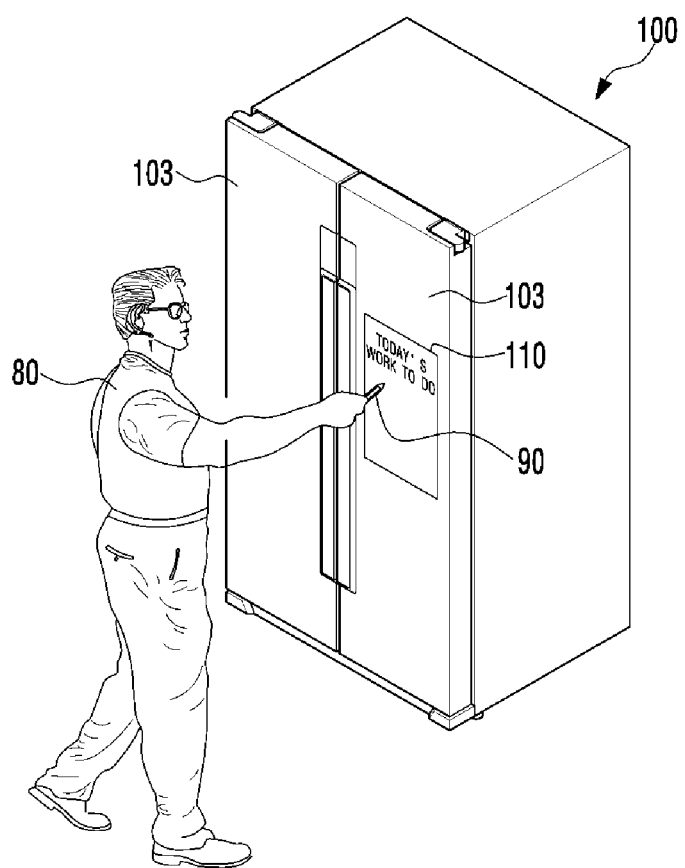
FIG. 18 is a view for describing an example of a refrigerator equipped with the display that performs a memo function, in the refrigerator of FIG. 1.

FIG. 18 is a view for describing an example of an exterior of a refrigerator equipped with the display that performs a memo function, in the refrigerator of FIG. 1.

In the example, cholesteric liquid crystals are filled in each cell 115 of the display 110.

First, the operating mode of the display 110 may be classified into the transparent mode and the display mode, and the display 110 may further include the opaque mode. In the opaque mode, a memo may be input from the user.

When selection of the opaque mode is input to the input unit 130 from the user, the controller 120 may make the state of the cholesteric liquid crystals into the focal conic state by adjusting voltages applied to the first electrode 111b and the second electrode 112b.

When the cholesteric liquid crystals are in the focal conic state, as illustrated in FIG. 18, the user 80 may input a memo using an input instrument 90, such as a pen, and the display 110 may display the memo simultaneously with inputting of the memo. However, the input instrument 90 is not necessarily used, and the memo may also be input by hand. Content displayed until the operating mode is converted into a different mode, can be maintained without any change according to a memory function of the display 110.

Selection of reset may be input to the input unit 130. If selection of reset is input, the controller 120 may delete the memo displayed on the display 110 and may convert a current state into a memo standby state.

On the other hand, when a touch panel is mounted on a front surface of the display 110, the memo input by the user 80 may be stored in the memory device disposed at the refrigerator 100, and even though an output mode of the display 110 is converted into a different mode, the re-stored memo can be imported. Here, the memory device may be embedded in the display 110 or may be disposed outside the display 110.

Hereinafter, a method of controlling a refrigerator in accordance with an embodiment of the present disclosure will be described.

Figure 19:
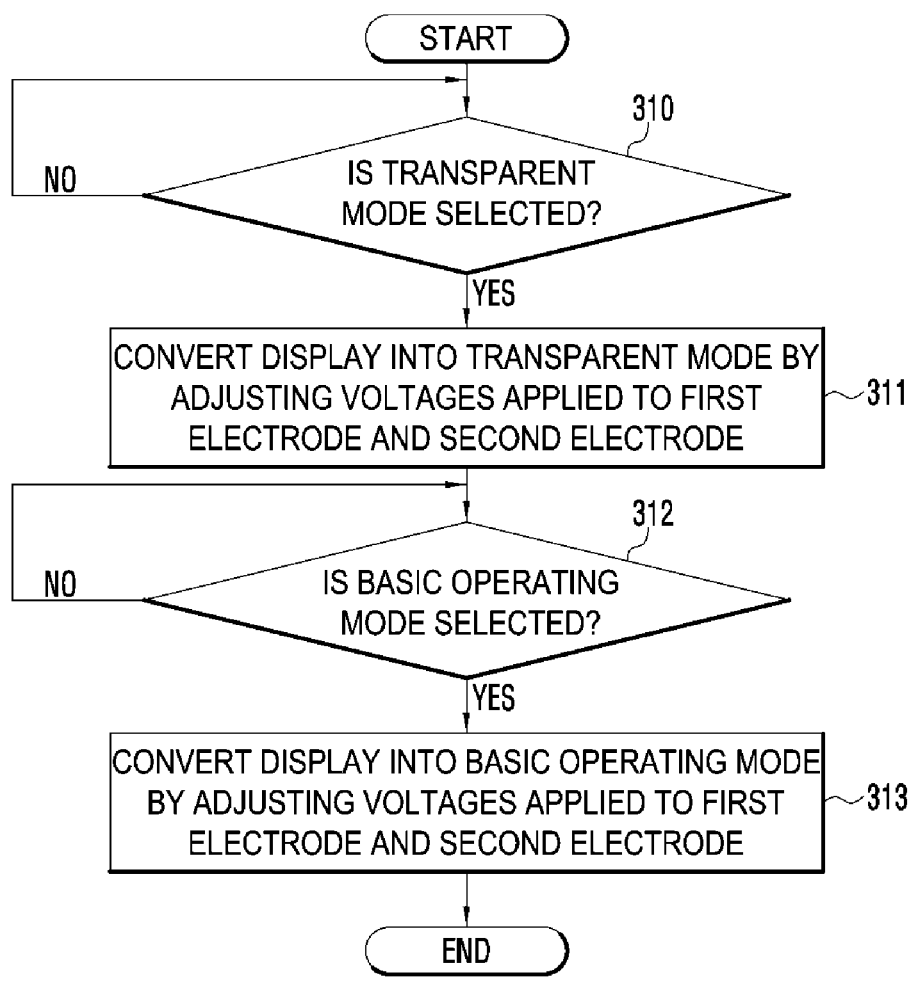
FIG. 19 is a flowchart illustrating a method of controlling a refrigerator, in accordance with an embodiment of the present disclosure.

FIG. 19 is a flowchart illustrating a method of controlling a refrigerator, in accordance with an embodiment of the present disclosure. The refrigerator in the current embodiment is the refrigerator 100 described with reference to FIGS. 1 through 18.

Also, in the current embodiment, a basic operating mode of the display 110 is displayed.

As illustrated in FIG. 19, if a transparent mode is selected (YES of Operation 310), the display 110 is converted into the transparent mode by adjusting voltages applied to the first electrode 111b and the second electrode 112b (Operation 311).

Selection of the transparent mode may be input by the input unit 130, and as illustrated in FIG. 1, the input unit 130 may be implemented using a hard key method, a touch pad method, or a touch panel mounted on the front surface of the display 110.

The electric field dependent layer 117 is formed between the first electrode 111b and the second electrode 112b of the display 110, and characteristics of the electric field dependent layer 117 vary according to the voltages applied to the first electrode 111b and the second electrode 112b, and transmittance or reflectance of light incident onto the display 110 varies. Thus, the controller 120 may adjust the voltages applied to the first electrode 111b and the second electrode 112b, and the display 110 may selectively reflect external incident light according to wavelength or may reflect all parts of the external incident light according to wavelength.

For example, the electric field dependent layer 117 may be a cholesteric liquid crystal layer. In this case, if the transparent mode is selected, the controller 120 causes the cholesteric liquid crystals to be in the homeotropic state by applying high voltages to the first electrode 111b and the second electrode 112b.

If the basic operating mode is selected (YES of Operation 312), the display 110 is converted into the basic operating mode by adjusting voltages applied to the first electrode 111b and the second electrode 112b (Operation 313). Selection of the basic operating mode may be input by the input unit 130.

The homeotropic state is a state in which high voltages are applied to the first electrode 111b and the second electrode 112b, i.e., a high electric field is applied to the cholesteric liquid crystals. By slowly reducing the high voltages applied to the first electrode 111b and the second electrode 112b, the cholesteric liquid crystals are in the focal conic state, and by rapidly reducing the high voltages applied to the first electrode 111b and the second electrode 112b, the cholesteric liquid crystals are in the planar state. Thus, when the basic operating mode is a display mode, the controller 120 causes the cholesteric liquid crystals to be in the planar state by rapidly reducing the high voltages.

Conversion of the basic operating mode may be performed by the user's selection, and if a predetermined reference time elapses, the display 110 may be automatically converted into the basic operating mode. Also, even when the reference time does not elapse, the display 110 may be converted into the basic operating mode by the user's selection.

Figure 20:
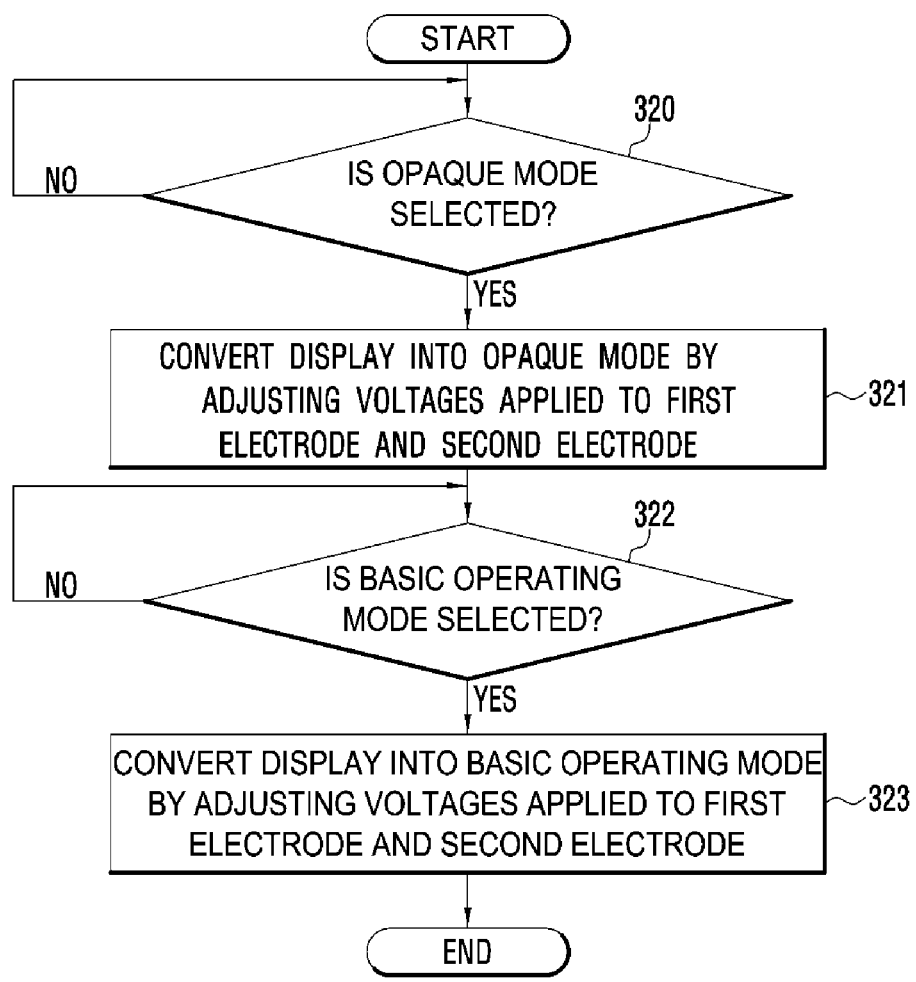
FIG. 20 is a flowchart for describing a case where a memo mode is selected, of the method of controlling the refrigerator illustrated in FIG. 19.

FIG. 20 is a flowchart for describing a case where a memo mode is selected, of the method of controlling the refrigerator illustrated in FIG. 19. The refrigerator in the current embodiment is also the refrigerator 100 described with reference to FIGS. 1 through 18, and the electric field dependent layer 117 is a cholesteric liquid crystal layer.

Also, in the current embodiment, an initial mode is a display mode.

As illustrated in FIG. 20, if an opaque mode is selected (YES of Operation 320), the display 110 is converted into the opaque mode by adjusting the voltages applied to the first electrode 111b and the second electrode 112b (Operation 321). Selection of the display mode may be input by the input unit 130.

The controller 120 causes the cholesteric liquid crystals in the planar state to be in the focal conic state by applying voltages to the first electrode 111b and the second electrode 112b. For example, the voltages applied to the first electrode 111b and the second electrode 112b may be 10 to 20 V. Since, even when the voltages are removed using bistability of the cholesteric liquid crystals, the cholesteric liquid crystals are maintained in the focal conic state, if the user inputs a memo onto the display 110, the display 110 is continuously maintained in a state in which the input memo is displayed.

If the basic operating mode is selected (YES of Operation 322), the display 110 is converted into the basic operating mode by adjusting voltages applied to the first electrode 111b and the second electrode 112b (Operation 323). Selection of the basic operating mode may be input by the input unit 130.

In order to restore the cholesteric liquid crystals in the focal conic state into the planar state, two operations may be undergone. In detail, the cholesteric liquid crystals may be made in the homeotropic state by applying high voltages to the cholesteric liquid crystals in the focal conic state, and the cholesteric liquid crystals may be made in the planar state by rapidly reducing the applied high voltages. In this case, the high voltages applied to the cholesteric liquid crystals may be 30 to 40 V.

Conversion of the basic operating mode may be performed by the user's selection. If a predetermined reference time elapses, the display 110 may be automatically converted into the basic operating mode. Also, even when the reference time does not elapse, the display 110 may be converted into the basic operating mode by the user's selection.

As described above, in a refrigerator and a method of controlling the same in accordance with the one or more embodiments of the present disclosure, a display that is capable of being transparently/opaquely converted, is disposed in at least one region so that an inside of the refrigerator can be identified without opening the door.

In addition, when the display disposed at the refrigerator is in an opaque state, the display can display a text or an image, or a memo can be input to the display from a user so that the refrigerator can be utilized in various manners.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A refrigerator comprising:
a body comprising a storage chamber;
a door that is coupled to the body so as to open/close the storage chamber;
a display that is disposed in at least one region of the door and is configured to be converted between a transparent mode and a display mode, the display comprising a first electrode, a second electrode and photonic crystals, which are filled between the first electrode and the second electrode and of which states vary according to an electric field applied to the photonic crystals;
a controller that controls the display to display at least one among a text, an image, and color when the display is in the display mode; and
an insulation member disposed on a rear surface of the display, the insulation member comprising a first transparent substrate, a second transparent substrate and at least one spacer formed between the first transparent substrate and the second transparent substrate to form a space between the first transparent substrate and the second transparent substrate, the space being in a vacuum state,
wherein the controller controls the display to be converted into a reflection mode, a display mode, a transparent mode and an opaque mode based on a selection by a user, and
wherein each of the reflection mode, the display mode, the transparent mode and the opaque mode are different from each other.

2. The refrigerator of claim 1, wherein the display is a reflective display that does not comprise a light source therein.

3. The refrigerator of claim 1, wherein in the opaque mode a memo is input by the photonic crystals in the display.

4. The refrigerator of claim 1, wherein in the reflection mode the display is used as a mirror by the photonic crystals.

5. The refrigerator of claim 1, further comprising an illumination unit disposed in the storage chamber,
wherein the controller controls the display to turn on the illumination unit when the display is in a transparent mode.

6. The refrigerator of claim 3, further comprising an input unit to which selection of the reflection mode, the transparent mode, the display mode or the opaque mode is input,
wherein the controller controls the display to be converted into the reflection mode, the transparent mode, the display mode or the opaque mode according to selection input to the input unit.

7. The refrigerator of claim 6, wherein the display displays the memo input by a user in the opaque mode.

8. The refrigerator of claim 7, wherein the input unit is configured so that selection of reset is further input to the input unit, and
the controller deletes the memo displayed on the display when selection of reset is input to the input unit.

9. The refrigerator of claim 7, further comprising a touch panel disposed on a front surface of the display,
wherein the memo is input through the touch panel.

10. The refrigerator of claim 9, further comprising a memory device for storing the input memo.

11. The refrigerator of claim 1, wherein, if a reference time elapses after the display is converted into the transparent mode, the controller converts the display into the display mode.

12. The refrigerator of claim 1, further comprising a sensing sensor that senses a user's access to the refrigerator,
wherein, if the user's access to the refrigerator is sensed, the controller converts the display into the transparent mode, and if it is sensed that the user is distant from the refrigerator, the controller converts the display into the display mode.

13. The refrigerator of claim 1, further comprising a circular polarizer disposed behind the display.

14. The refrigerator of claim 13, wherein the circular polarizer comprises a quarter wavelength plate and a linear polarizer.

\* \* \* \* \*